United States Patent [19]

Ragle et al.

[11] Patent Number: 4,502,082

[45] Date of Patent: Feb. 26, 1985

[54] SPIRAL RECORDING AND ASSOCIATED SYSTEM

[75] Inventors: Herbert U. Ragle; Norman S. Blessum, both of Thousand Oaks, Calif.

[73] Assignee: Burroughs Corporation, Detroit, Mich.

[21] Appl. No.: 970,578

[22] Filed: Dec. 18, 1978

Related U.S. Application Data

[63] Continuation-in-part of Ser. No. 807,155, Jun. 16, 1977.

[51] Int. Cl.³ .............................................. G11B 5/43
[52] U.S. Cl. ...................................... 360/76; 360/77
[58] Field of Search .................................. 360/76–78, 360/71, 21, 106, 109, 135; 358/128

[56] References Cited

U.S. PATENT DOCUMENTS

| | | | |
|---|---|---|---|
| 3,185,972 | 5/1965 | Sippel | 360/76 X |
| 3,665,118 | 5/1972 | Cooper, Jr. | 360/21 |
| 3,678,220 | 7/1972 | Luhrs | 360/71 |
| 4,064,539 | 12/1977 | Lewiner et al. | 358/128 |
| 4,074,328 | 2/1978 | Hardwick | 360/76 X |
| 4,142,209 | 2/1979 | Hedlund et al. | 365/234 X |

FOREIGN PATENT DOCUMENTS 2713194  5/1978  Fed. Rep. of Germany ........ 360/77

OTHER PUBLICATIONS

IBM/TDB, vol. 4, No. 5, Oct. 1961, pp. 24-25, "Transducer Position Sensor", by Tsilibes.
IBM/TDB, vol. 5, No. 1, Jun. 1962, p. 33, "Magnetic Head Positioning", by Buslik.

*Primary Examiner*—John H. Wolf
*Attorney, Agent, or Firm*—John J. McCormack; Nathan Cass; Kevin R. Peterson

[57] ABSTRACT

Techniques and associated apparatus for a magnetic disk transducing system adapted to record along spiral tracks in a Herringbone pattern, using a pair of orthogonal skew gaps, operating in tandem.

24 Claims, 15 Drawing Figures

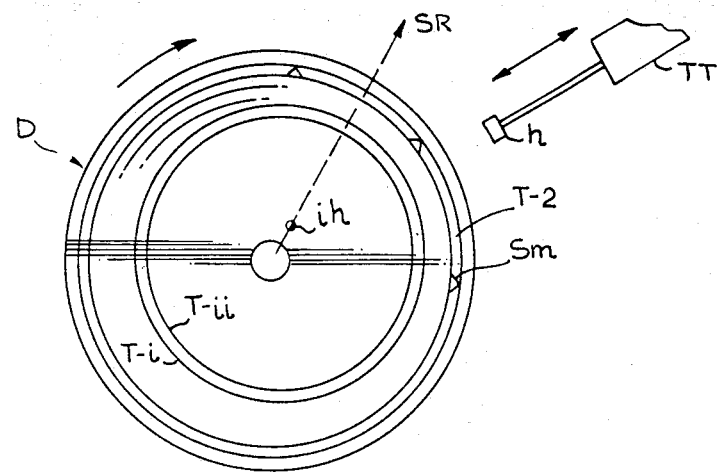
Fig. 1
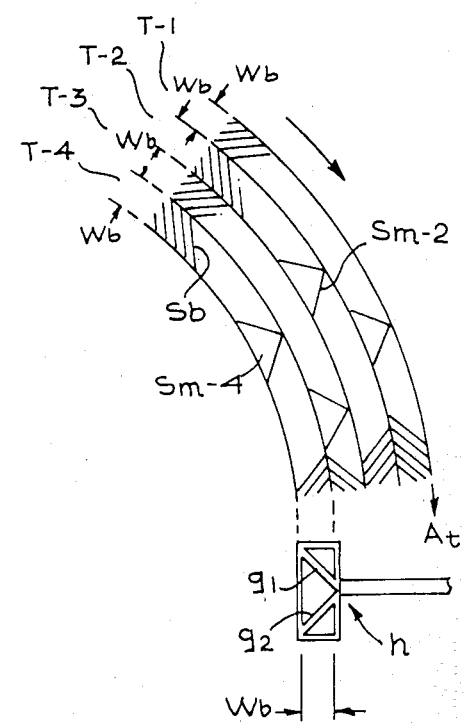
Fig. 1A
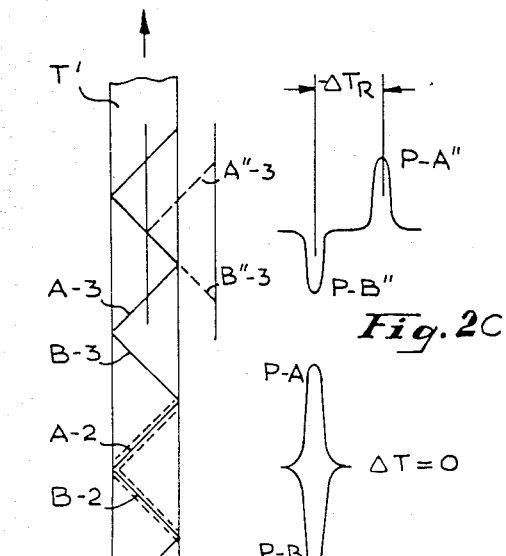
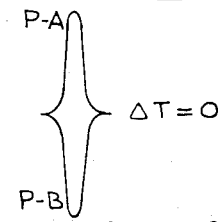
Fig. 2C
Fig. 2B
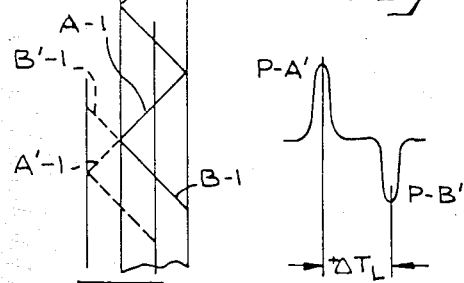
Fig. 2A
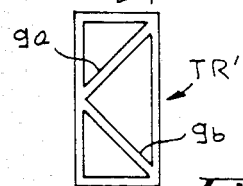
Fig. 2

SPIRAL RECORDING AND ASSOCIATED SYSTEM

CROSS REFERENCE TO RELATED APPLICATION

This is a Continuation-in-part of copending commonly assigned U.S. application, Ser. No. 807,155, filed June 16, 1977, entitled "Improved "Track-On-Data" Technique and Associated System", by Herbert U. Ragle and Norman S. Blessum.

BACKGROUND OF THE INVENTION

The subject invention relates to magnetic disk recording systems and particularly to "spiral" track recording therewith.

Those in the magnetic recording arts recognize the need for improved techniques and associated apparatus for better, more effective data detection. Efforts have continued for sometime now to fill this need.

One conventional type of recording system involves "concentric track" recording where a magnetic disk [typically used as peripheral memory equipment in a computer system to provide temporary or permanent information storage during computer operations] is recorded-upon in concentric tracks. In one well-known configuration, one, or several, such disks are mounted to be rapidly rotated in operative relation with transducer means, the disk having a multi-track magnetic recording surface on at least one of its faces. One, or several, recording heads are, in turn, adapted to be positioned along each disk-face—i.e., to register with any selected one of the concentric recording tracks on the disk to record and detect data signals along any track.

Workers will recognize that optimal use of such media requires that information be recorded with minimal effort and at the highest possible density. However, concentrictrack disks—unlike tape—present the problem of "limited-length record fields" (or "closed-ended fields") whereby the defined (circumferential) length of a given track usually compels one (e.g., a Programmer, a User, the Designer) to either waste "terminal space" or interrupt a data field which happens to occur there. For instance, if a given track fills up with data fields until only a fifty-bit segment remains and the next convenient record subset to be recorded is 60 bits long, one must either shift to another recording track (wasting this 50-bit space), or interrupt this 60-bit subset; paying the usual price in "overhead" (e.g., added bits to note the interruption, identify the continuation, etc.; and the added complexity in software labor, etc.).

But, with tape, or any like record offering "open-ended fields", this problem will not arise (except in rare instances; e.g., at "end-of-tape"). This invention is directed to providing spiral track disk recording which offers such "open-ended fields" and other advantages.

Workers will recognize that, for the typical magnetic disk system, a recording head is translated radially across the disk so that the magnetic transducer gaps mounted therein may be selectively positioned adjacent a selected recording track. In this way only a few transducer gaps need be used for recording and reading data on a number of disk tracks—but to practically implement such a system, one must maintain very precise control of head location relative to the tracks—and this typically must be done very quickly to minimize access time for the computer system served.

For instance, with disks used in a random access magnetic memory the data bits are recorded in concentric circular tracks so there is a continual need to secure and maintain very accurate registry of a magnetic transducer with a selected track. Unfortunately, the precision of the transducer-positioning system will determine track spacing tolerances and accordingly will influence data storage efficiency (bit compression) significantly—that is, the number of characters per unit memory area will depend upon the accuracy of transducer positioning. Workers have attempted in various ways to improve the accuracy of transducer positioning, for "servoing" the transducer onto disk tracks. Such systems have commonly employed "position signal" tracks (or track sectors) interspersed with the data tracks and have also required a special servo transducer detector to detect the "position-signals". Other approaches use "track-on-data" techniques (e.g., see Parent U.S. Ser. No. 807,155 cited above). This invention can allow one to avoid all inter-track re-positioning difficulties by adopting "spiral" recording—whereby, once a track is located, one merely "follows" the track for n revolutions, keeping centered thereon.

Workers in these arts will recognize that it is quite desirable to "track-on-data", that is to somehow use an area devoted to "data-bits" (i.e., "information signals" developed from certain magnetic transitions) to also provide position control signals which may be fed to a positioning servo and control the positioning and/or alignment of a transducer relative to a recorded track. Obviously, such a technique can eliminate the need for a separate "servo" recording unit and related separate recording zones for servo data (such as separate servo disks or separate servo tracks, or track-sectors, typically seen in conventional magnetic recording systems), since the data-transducer and the data-recording zones may be used for servo-bits too. The invention accomplishes this, providing a "spiral" mode of recording with "track-on-data" capability (e.g., as opposed to other methods of centering—see Parent Ser. No. 807,155 for citations to some such), with no need for separate servo tracks and providing a "servo transducer" which is integrated with a "data transducer", with servo-bits being incorporated into the data recording zones as desired.

INVENTION FEATURES

The present invention is a significant improvement over prior related techniques, teaching the use of a "multi-gap" transducer array adapted for spiral recording—e.g., with a gap pair oriented to be mutually orthogonal, as well as disposed "in-line", along the track-direction (hereinafter these are called "di-gaps"). These gaps are adapted to conjunctively read two different kinds of (data/servo) bit sets arranged along the track—with one kind of bit aligned with one such gap, and the other kind at right angles thereto, to be thus aligned with the other gap. The servo-bit locations may indicate head-misregistration and, as detected, do so in terms of elapsed time between prescribed servo signals along any given track. Alternatively, or supplementarily, one may use a radially-aligned, "dual-gap" array adapted to track skewed, orthogonal bits along a pair of tracks simultaneously.

According to one feature, systems according to the invention so function without inter-track "guardbands" or the like; disposing adjacent data tracks in abuttment with one another. Also, the magnetic data transitions are skewed in parallel along one track, while being transversely skewed (orthogonal to these first transitions) along both flanking tracks. As explained, this can minimize adjacent channel interference and can also dispense with the need for such things as "guardbands". According to one embodiment, servo positioning signals are interspersed among data-bits and detected with a single "di-gap" transducer head. ["Di-gap head" hereinafter referring to a pair of positionally-related, track-aligned, magnetic transducer heads, each head comprising a pair of pole pieces separated by a transducing gap and wound with an associated coil-activation circuit—though the windings and one pole-piece may, of course, be shared].

Of course, others have contemplated the use of "orthogonal data tracks" (e.g., see the cited Sippel patent). Likewise, others have thought about monitoring head registration according to the alignment of a transducer gap relative to an array of parallel magnetic domains arranged diagonally across a recording track (e.g., see the "herringbone" servo tracks and related detection technique taught in U.S. Pat. No. 3,686,649 to Behr). Also, others have a kind of spiral recording on disks— e.g., as with the sprial audio tracks on a phonograph disk record.

However, the instant "spiral/track-on-data" arrangement will be distinguished as novel and unexpectedly effective, combining the oblique "herringbone" track pattern and "servo bits" (registration "di-bits") with spiral recording—also preferably with centering effected by sensing head registration along a data track— —the di-bit pattern being sensed by an associated "di-gap" head—e.g., preferably with one ("servo") gap thereof being adapted to detect a shift in lateral head position (misregistration) according to a varying time interval between detected servo signals. (E.g., between a reference servo signal and a variable servo signal). Of course, workers have heretofore suggested orthogonal skewed data tracks along a magnetic record, as well as superposition of recording transitions (e.g., U.S. Pat. No. 2,929,670 to Garrity). However, it will be seen as novel to so use spiral recording with (one or more) multi-gap heads, allowing either servo data or work data, or both, to be transduced by either or all gaps.

In a preferred embodiment for instance, the work-bits are impressed "skewed", at a prescribed angle oblique to track direction, while servo-bits are arranged along the same track with their magnetic domains aligned transverse to these "work domains" and disposed at prescribed regular intervals along the track. Such work-bits and servo-bits are oriented to interact with a common double-gap transducer unit, with both magnetic gaps registered along the selected track, and with one gap aligned parallel to the work-bits, the other parallel to the servo-bits. Such a system obviously maintains a fixed spatial relation between data transducer and servo transducer in a very simple convient fashion, as well as keeping them inherently synchronized (that is, they traverse the medium at the same speed and direction).

According to a preferred embodiment this arrangement is capable of easily providing "registration feedback" along the entire length of a spiral track. That is, with this technique and associated apparatus, the multi-gap transducer head may be registration-referenced to the contemplated magnetic recording medium (moving along a prescribed direction), and may be repositioned for centering therealong.

At least one gap pair is used, with the paired work gap and servo-gap both skewed with respect to track axis and transverse to one another. The servo output is coupled to a head-positioning arrangement adapted to reposition the gap pair radially on a disk for centering over a selected track. Preferably, the servo-bits, (head positioning information) as well as "work-bits", are both recorded along the same track, so that the work-bits pass in alignment with one of the transducer gaps, while the servo-bits align parallel to another gap.

Thus, once the di-gap head is registered on a given track its gap should register with the servo-bits and the work-bits respectively so as to generate respective servo signals and data signals. According to this feature, either gap may handle either signal.

Preferably, the gap sensing servo-bits will provide a servo output reflecting the time interval between successive servo-bits—this, in turn, reflecting any shift in head position to the left or right of the track center line. Preferably, the servo signals "follow" the transit time of the head; accordingly, the servo output may be interpreted as a distance-indicating signal whose variance from a prescribed norm (representing perfectly registered, or centered, head over a subject track) represents the lateral head variance or misregistration, and thus may be used to cause a responsive servo system to reposition and center the head (known systems which seek a "zero error" feedback signal). Such a servo output control over the radial positioning of the head can be implemented, using conventional servo means, as known in the art.

Such a servo output may be especially apt for maintaining head registration with a spiral track (or any other disk track which varies in radial position as a function of rotational position)—e.g. the servo output being continually compared with a reference signal representing "registration" (centered alignment of the head along the track—e.g., via "Table-Lookup") to derive a servo controlling "difference signal" controlling the servo to reposition the transducer leftward or rightward and so reach a "zero-error" position (i.e., registration).

Preferably, such an arrangement is used with disks having "adjacent abutting" data tracks with data bits aligned oblique and parallel along a track and orthogonally between tracks, with a respective pair of transducer gaps disposed "in line" to be translated along a selected track either, or both, gaps to develop both data and servo signals therefrom.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements.

FIG. 1 is a very schematic plan view of a magnetic disk record with a simple "non-spiral" record track indicated as position encoded according to one embodiment; FIG. 1A showing an enlarged area of the disk as disposed relative to a di-gap transducer provided according to the invention;

FIG. 2 indicates a single record track, encoded by position and disposed relative to associated transducer indicia according to a related feature; while FIGS. 2A, 2B, and 2C indicate suggestive transducer dual-outputs for three illustrative transducer positions;

FIG. 8 illustrates "single (di-gap) head/single track" spiral disk recording according to one propaedeutic embodiment, like those of FIGS. 1 and 7, while

GENERAL DESCRIPTION, BACKGROUND

Figure 3:
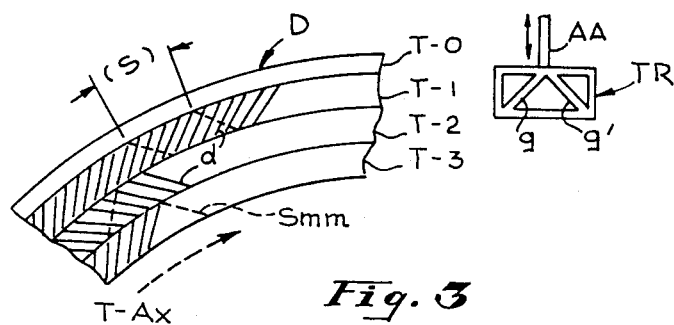
FIG. 3 illustrates a fragmentary plan view of a portion of another like magnetic disk record, greatly enlarged, with adjacent tracks and magnetic domains, including "another position" indicia embodiment therein schematically indicated in positional relation with an associated "di-gap" magnetic transducer; an enlarged showing of one of these tracks and the associated transducer being indicated in FIG. 3A are related indication of illustrative transducer outputs in FIG. 3B.

FIG. 1 schematically illustrates a magnetic recording disk D constructed according to principles of this invention. This, and other magnetic recording means discussed herein, will generally be understood as constructed and operating as presently known in the art, except where otherwise specified. Such a recording disk is relatively conventional, being about one foot in diameter and formed of a non-magnetic substrate material with a thin magnetic recording medium applied to one face.

Such disks are commonly mounted on a turntable which is seated on a precision-bearing spindle and rotated at high speed during operation. Thus, every bit along any selected circumferential track (see illustrative recording tracks T-1, T-2 and T-3 in FIG. 1A) is swept past magnetic transducer means (here, see transducer head "h" on arm TT) many times a second for minimum access time and high speed read-out. In a commercial disk unit, one or several such disks is employed, each having one or several transducers per disk. Conventionally, record information ("work-bits") is recorded along the data tracks. One or several servo-transducer means is often provided and arranged to be operated in conjunction with special servo-tracks (or track-sectors) on which servo-data (servo bits) is recorded.

The rotational rate (rpm) of disk D is normally carefully controlled so that any small relative change in rotational speed is quickly corrected and so the magnetic reading and writing operations are kept constant. Conventionally, the rotational position of the disk is indicated by angular encoding means, clock tracks, index indicia (e.g., hole "ih" along "start radius, SR", FIG. 1), or the like. Such features are conventional and not detailed here since they are not of special significance in practicing the invention.

This servo information is used to align a transducer head (here, see head "h" mounted on transducer-translator unit TT and conventionally positioned thereby) radially of disk D, i.e., with its transducer gaps registered with a given selected track on disk D, using means well known in the art (and not shown or described here). A reference radius is conventionally indicated by passage of an index indicium over a related detector (e.g., here, see index hole "ih" along "start radius" SR). Complicating this servo function are the typical deviations of disk tracks from perfect concentricity (with one another and/or with their disk). This is indicated by tracks T-i, T-ii which will be understood as out of concentricity, both with disk D and with reference track T-2.

Representative tracks of disk D are fragmentarily shown—exploded and with recording bits also illustrated—in FIG. 1A along with an enlarged, very schematic showing of head "h", understood as adapted for recording and detection of such bits.

As is conventional, it will be understood that work bits in the form of magnetic signals "wb" are recorded on the face of disk D by a transducer-gap provided in the transducer array (here, represented by either of the gaps "g" of "di-gap head" "h") which is appropriately positioned. Head "h" will be understood as coupled mechanically to a positioning unit (not shown) including position-actuator means arranged and controlled so that transducer "h" is translated radially across D to be operationally superposed over a selected track (very schematically indicated by head translation arm TT and generally understood in the art, hence no details are indicated or necessary).

Thus, for example, the position control can comprise a so-called "voice coil actuator", i.e., a magnetic positioning device very similar to that employed in loud speakers. Such actuators are generally preferred because they are inexpensive, fast, accurate and readily controlled with conventional circuitry. However, if desired, other mechanical, electromechanical or hydraulic positioning control means may be employed, as is well known in the art.

Work-bits "wb" will be understood as recorded along the disk tracks by appropriate energization of the related magnetic transducer gap in head "h", and to comprise a sequence of magnetic transition signals of identical encoded magnetic polarity and alignment. Here, preferably, and according to a feature aptly employed with the invention, work-bits "wb" are impressed at a common prescribed angle to be all similarly oblique with respect to the respective track axis $A_t$. (The direction of translation of the track with respect to the transducers).

According to one feature, a bit encoding scheme establishes, for each track, a prescribed alignment for work-bits and for servo-bits, this alignment being arranged to automatically indicate registration, or centering, of transducers with respect to a track). For instance, for tracks T-1, T-2, T-3, etc., in FIG. 1A, it will be understood that the work bits "wb" are aligned in one oblique direction along all "odd-number" tracks (e.g., T-1, T-3) and aligned transversely in all "even-number" tracks (e.g., T-2). The servo-bits "sm" are aligned semi-orthogonal to the work-bits along any given track. Bits "sm" will be characterized as "centering di-bits" as explained below and will be understood as "LAMBDA-configured" relative to the track—i.e., like "Λ", as for a Greek (capital) LAMBDA (or like its inverse: "V"; e.g., in contradistinction with "tilted-V" marks, or "<", ">"—such as shown in U.S. Pat. No. 4,074,328 to Hardwick).

These recording tracks will be understood as schematically represented here by a mere sector of the full disk/track circumference; there being a great number of such tracks understood as concentrically arranged, in abuttment, on disk D. Each of the concentric recording tracks is distinct in location, length and curvature and the transducer and associated gaps must be very precisely registered thereon before writing or reading may be properly performed—as workers in the art very well know.

Thus, in order to position a transducer gap in operative (read/write) relation above a selected track, the position of the transducer head must be detected and checked for "centering" along this track. Conventionally, a raw position signal would be compared with a reference signal which represents the "centered" (or registered) head position. Any discrepancy between these indicates the degree of misregistration and is processed to result in an "error signal" fed back to a position controller (in a conventional servo loop) for precise repositioning and control of the head.

In some known systems, track location is indicated by "servo-bit" magnetic transitions provided along special dedicated servo tracks, of a disk. In one well known system, such servo-bits are recorded along special servo tracks disposed between adjacent data tracks, as suggested, for instance, in the cited U.S. Pat. No. 3,686,649 to Behr. By contrast, in the subject embodiments, the data tracks are abutted (radially) with the bits aligned to be orthogonal between adjacent tracks—doing away with intervening spaces for servo tracks, guard-bands, etc.

Such a "radially-abutting" track configuration will be recognized as facilitating maximum track density. However, this makes it necessary to record servo information bits along a portion of the data tracks. It also makes it critical that the read/write gaps be positioned very accurately, since a transducer gap might otherwise easily drift over an adjacent recording track. These requirements are met in systems according to the invention, with a "di-gap/di-bit" servo control described hereinafter. That is, a transducer is provided with a pair of skewed orthogonal gaps, [such as gaps $g_1$, $g_2$ of head "h" in FIG. 1A]; and related servo bits are recorded to comprise at least one pair of similarly-skewed, mutually-orthogonal servo-bits [such as servo-bits "sm" in FIGS. 1 and 1A].

FIG. 1

Turning to the details of FIGS. 1 and 1A, the indicated magnetic transducing arrangement will be understood as adapted to operate upon the abutting concentric data tracks T-1, T-2, T-3, etc., of a magnetic recording disk D, when the disk is rotated in the known manner. Servo-bits "sm" in the form of skewed, mutually-orthogonal di-bits will be understood as distributed in a prescribed manner along each given track T, being inserted among the work-bits "wb", along with (track/sector) identifying bits "sb". Work-bits "wb" are aligned in parallel, and similarly skewed, along every track, being "orthogonal" between adjacent tracks (i.e., they are "skewed and adjacent-orthogonal"). This magnetic information will be understood as conventionally recorded and sensed. Such as indicated suggestively by "di-gap" read/write head "h" adapted to be moved radially across disk D to any selected track-location where the transducer gaps will lie superposed above a "selected" track T and centered therealong in close "read/write relation" therewith (see FIG. 1A).

According to one recited feature, head "h" includes at least one "di-gap" array; i.e., a pair of skewed orthogonal gaps $g_1$, $g_2$. Head "h" has a width $w_h$ approximately equal to the (uniform) radial width of $w_t$ of the tracks. Thus, when head "h" is moved into prescribed registration (exactly-centered relation) with a given track T, one of its gaps "g" will align and superpose coincidently with one set of bits (—either "wb" or "sb"; or one half of di-bits "sm", these bits extending across the track in a "first" skew-alignment—) while the companion gap will be similarly aligned with a second set of bits orthogonal to the first. Thus, gap $g_1$ in FIG. 1A, passing along track T-4, (or any "even-no.-track") aligns with "track-sector identifying" bits "sb", and with one of the servo di-bits "sm", while the other gap $g_2$ will align with work-bits "wb", and with the other half of di-bit "sm". Conversely shifting head "h" to be centered along track T-1 (or any "odd-no. track") will reserve this registration-relation, e.g., $g_1$, aligning with the work-bits "wb", there.

The "magnetic congruency" of such a di-gap transducer and such servo di-bits, (or "chevrons") when a head is centered over a recording track will be seen as facilitating advantageous servo control—with the degree of off-centering, or misregistration, being sensed according to how closely such a di-bit "fits" the passing di-gap—as further described and explained below. This concept will also be better understood upon consideration of the alternate arrays in FIG. 2 described as follows.

FIG. 2

Here, a "di-bit" data track T' is shown in operative relation with an associated "di-gap" transducer assembly TR' understood as passing over representative tract T' in the direction of the arrow, in magnetically operative relation with bits A, B, therealong, but in slight misregistration, with respect thereto (misregistered "to the left"). Transducer TR' thus includes a pair of skewed, mutually-orthogonal transducer gaps $g_a$, $g_b$ aligned oblique (here, preferably 45°) to the axis of track T'. Track segment T' may be understood as a servo-sector like these indicated in FIGS. 1, 1A with similar "di-bits", comprised of relatively orthogonal first and second di-bit-halves, (i.e., magnetic recording half-bits A and B respectively, analogous to servo di-bits "sm" above). Di-bits A, B will be understood as each aligned with a respective transducer gap ($g_a$, $g_b$) and thus orthogonal to one another and oblique (also 45°, preferably) to the track direction (arrow). Track sector T' shows only servo bits and no work-bits, and is here represented as "linear" rather than "curvilinear" (as the actual face of a magnetic recording disk would be)—but only to simplify the explanation. Those skilled in the art will obviously extend the principles explained to curved disk tracks, and other relevant media, including work-bits too, as a matter of course.

Now, it should be understood that the relative disposition of the bi-bit pair A, B and gaps $g_a$, $g_b$ (their spacing and relative angular orientation) is such as to render "magnetic congruency" between a bit and a respective gap when head TR' is centered exactly (registered) along track T'. Thus gap $g_a$ will coincide with bit A and gap $g_b$ will coincide with bit B at a certain time during track passage—and the detecting transducers will thereupon generate a corresponding pair of coincident opposed "servo-output" pulses. A relatively perfect congruence of di-gaps and di-bits is signalled in FIG. 2B by the simultaneity of symmetrically-opposed pulses P-A, P-B representing detection of bits A-1, B-1, etc., by head TR'; pulse amplitude may be equal, but this is not always necessary, though it facilitates a "null-balance" indication of perfect registration, of course, as workers will recognize). This opposite polarity output is readily rendered by known methods.

On the other hand, a slight misregistration of head TR' to the left, as depicted in FIG. 2, should produce the kind of (successive, spaced) non-coincident output pulses indicated in FIG. 2A wherein pulse P-A' (produced by passage of gap $g_a$ over bit A-1) will obviously occur somewhat earlier in time than the companion output pulse P-B'—P-B' reflecting the later passage of gap $g_b$ over companion bit B-1. And, the time-discrepancy $+\Delta T_L$) between output pulses will be a measure of the degree of head misregistration (the positive sign indicating misregistry to the left), as workers in the art will appreciate.

Conversely, rightward misregistration of transducer TR' is signalled in FIG. 2C (such head misregistry not shown here, but indicated schematically by "phantom bits" A''-3, B''-3 in FIG. 2) by the non-coincident servo (timing) pulses P-A'', P-B''. Here, output pulse P-B'' from gap $g_b$ "leads" output pulse P-A'' from companion gap $g_a$ by a time delay ($-\Delta T_R$) which corresponds to the degree of rightward misregistration (and accordingly is designated as negative delay time).

Workers will visualize other like arrangements for correcting head misregistration wherein transducer di-gaps align oblique to the transport direction can likewise interact with associated (similarly oblique) di-bits so that exact head/track registration is indicated by coincidence of the paired output pulses, while misregistration is indicated by positive or negative non-coincidence. In certain cases such servo-bits may, themselves, constitute work-bits ("record data"), especially where the work-bits are skewed 90° between adjacent tracks (as in FIGS. 1 and 2).

Figure 4:
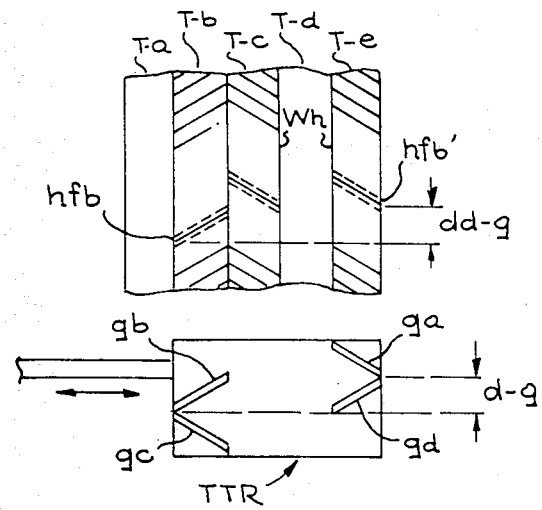
FIG. 4 illustrates, in plan view and greatly enlarged, a schematized fragmentary showing of a set of tracks like those in FIG. 3 as related to "double di-gap" transducer means and data bits indicated according to another arrays.
Figure 6:
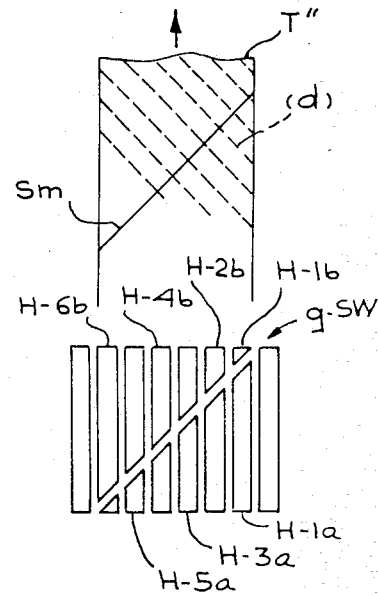
FIG. 6 is similar to FIG. 2, indicating a modified form of position-encoded indicia and associated transducer gaps along a track.

This is indicated very schematically in FIG. 4 where segments of abutting adjacent disk tracks T-a, T-b, T-C, T-d, T-e is depicted as comprising skewed work-bits "wb" which are "orthogonal adjacent". According to this feature, periodically a high-frequency burst of "special-bits", hfb, hfb'—similarly skewed—are laid down for head-centering purposes. Workers will appreciate that bits hfb, hfb' may substitute for di-bits like "sm" above. It will be evident, that, according to another mode of "di-gap/di-bit" operation a transducer such as TTR with at least one related di-gap pair (see orthogonal gaps $g_a$, $g_b$) may be provided, with the gaps spaced "across tracks" (rather than "along a track" as above) by a prescribed (odd) number of track widths (here, three—this distance accommodating reasonable gap spacing and head manufacturing tolerances). Di-gap $g_a$, $g_b$ will sense the high-frequency bit pair hfb, hfb' coincidently as an indication that head TTR is perfectly centered over tracks (T-b, T-e); non-coincidence indicating misregistry, as before.

It will be evident that the di-bit pair can be variously offset in space (e.g., by offset spacing dd-g, the same as offset d-g between gaps $g_a$, $g_b$) or offset in time (electronically)—gap-to-bit coincidence being provided for either spatially or electronically. Of course, such "work-bits" may be otherwise modified and distinguished to thus serve as "servo-bits"—for instance, written as "invalid bits" (e.g., preceded by three or more (3+) "zeros") or as "special bits".

Also, the head TTR may include a second orthogonal gap pair (here, $g_c$, $g_d$) to accommodate the sensing of work-bits in other tracks (e.g., T-a, T-c, T-e for $g_c$; T-b, T-d, etc., for $g_d$). These second gaps are not needed however and will typically be included only where cost-justified.

Similarly, one oblique gap may be translated along such a track to detect certain aligned servo bits and to generate servo-positioning pulses, with these pulse signals "referenced to center" according to their degree of coincidence with a prerecorded set of "clock signals". The servo output may be time-referenced to such clock signals (indicating "center-track registration" of the servo gap) and thus eliminate the need for contemporaneous detection of a second servo-bit with a second orthogonal gap, as described above. In certain cases (e.g., FIG. 1A) part of a track-sector will include only servo-bits, with abutting "blank track segments" flanking the sector radially, to eliminate risk of noise. This is preferred for this "track-on-data" operation and maximizes data compression.

In any event, the foregoing techniques will be appreciated as facilitating a true "track-on-data", or "servo-on-data" operation, locating the servo-bits directly adjacent their associated data bits and avoiding the difficulties and errors of remotely-located servo indicia.

OPERATION

Returning now to FIGS. 1 and 1A, it will be apparent that a simple, convenient mode of operation may be used to develop "centering information" from servo di-bits "sm" by proper positioning and manipulation of the associated set of skewed di-gaps $g_1$, $g_2$ of head "h". Generally speaking, this will involve head "h" being coarsely-positioned over a given "selected" track; then the servo di-bits being sensed for their degree of congruence with di-gaps $g_1$, $g_2$, so that any minor centering-adjustments necessary can then be made—then, with registration thus assured, optimal data transfer (read-out or writing) may proceed.

More particularly, an illustrative, step-by-step servo sequence is now described as follows (see FIG. 1):

ASSUMPTIONS

The control memory will contain a formatting code indicating the "normal" position (i.e., associated delay-time post "start time") of servo-bits "sm" on each disk track when the head is "centered" there. As FIG. 1 indicates, servo-bits "sm" are distributed about each track T [preferably at the "preamble" to each "data sector", being followed there by "identification bits" "sb", then by the record data (work-bits "wb")] using a frequency matched to servo response. That is, for a given medium velocity, the servo system will have a certain nominal response time for carrying out head-centering position adjustments. For instance, it may be able to complete a repositioning sequence within about 1/10 of a disk revolution—accordingly bits "sm" should be disposed every 36°, or less, for optimal servo response.

Bits "sm" may be prerecorded when a disk is "initialized". Also the format for orientation of work-bits "wb" will be predesignated so that, for instance, bits "wb" will be aligned with gap $g_1$ for all the "odd number" tracks (T-1, T-3, etc.), and aligned with gap $g_2$ for all the "even number" tracks (T-2, T-4, etc.).

And preferably, the servo-bit preamble to each sector, such as indicated at di-bit "sm" in FIG. 1A, will be arranged so that the adjacent abutting track segments are "blank", with no bits recorded thereon, thus avoiding interfering pickup if head "h" is misregistered along a sector-preamble. The "servo preambles" for alternate tracks may be aligned along a common radial-direction as in FIG. 1A, or else be offset rotationally so as not to interfere with this operation.

First Step: Head "h" enters the track area and is roughly centered by coarse positioning means (known, not described) over "selected" track T-4. Now a "centering sequence" is invoked before any data transfer (i.e., "read-out" or "write-in") is attempted;

Second step: At an appropriate "start time" (e.g., following the passage of index hole "ih", as is well known in the art), the servo control stage will begin to monitor the output from gaps $g_1$, $g_2$ to "look for" for di-bit sensing and related "servo output" for both transducers. That is, the next following prerecorded servo di-bit or "chevron", "sm" will initiate this servo output (as in FIGS. 2A, 2B, 2C) and be used to identify the track, data block, etc., as well as in a "centering check".

Third step: Centering of head "h" takes place responsive to the output sensed from chevron "sm"-4 (functionally, along the lines indicated elsewhere). Thus, if one servo output pulse is significantly (e.g., beyond a given range) out of coincidence with the other servo output pulse, head "h" will be shifted to correct this—then, with the gaps properly centered, the centering-check is repeated, data block identified, etc., and—finally—read-out of work-bits may begin.

Fourth step: With the gaps now properly "registered" with the bits along "selected" track T-4 (FIG. 1A) optimal, accurate data transfer may begin. Accordingly, the gap $g_1$ output might then be gated to read-out the track number and sector number indicated by (aligned) sector bits "sb"; and thereafter to read-out the work-bits "wb" sensed by companion gap $g_2$.

Workers will appreciate how simple such a servo centering technique is and how it assures that the head is centered over a track before any read-out may begin. This maximizes the gap/bit congruency and the associated accuracy and efficiency of bit detection and/or writing, while at the same time accommodating maximum track density with less concern for head misalignment.

More particularly, a known digital servo system may be set to invoke a certain number of "positioning steps" when translating head "h" fully across a track width (e.g., 30 steps to cross a bit-track completely). And a "centered" limit may be set such that a certain minor misregistration is tolerated (e.g., up to 3 servo steps, or the "time disparity" $T_L$ between di-gap output pulses which corresponds to this, as indicated in FIG. 2 above).

Workers will recognize that servo response to the misregistration (of the di-gaps with the servo di-bits) detected may be a relatively gradual and continual thing. That is, with many sectors and associated sector-preambles normally occurring along a given track, the servo positioning means may be referenced to "coincident di-gap output" several times per disk revolution, with head "h" being responsively "recentered", to some extent, each time a servo di-bit passes. This facilitates a smoother, more gradual and continuous, "centering" mode as workers will appreciate. It also helps to compensate for disk eccentricity and "run-out" along any given track—something quite complex and difficult to accommodate with conventional means.

ECCENTRIC TRACKS

Workers will recognize various applications of the above features; for instance, when tracks are recorded in parallel about a disk to be out of "concentricity" with the disk somewhat. Such "eccentric tracks" are familiar to workers and occur not infrequently (e.g., due to local variations in turntable/shift alignment, etc.). Such are illustrated by eccentric tracks T-i, T-ii, in FIG. 1.

Figure 7:
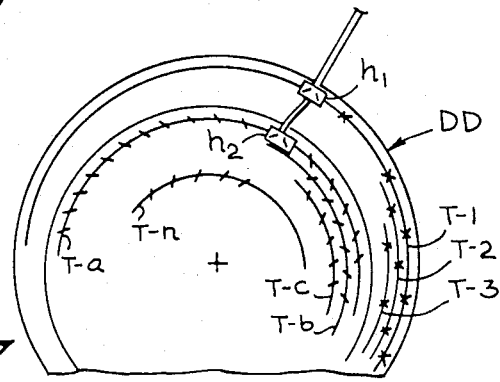
FIG. 7 is a plan view of a disk record as in FIG. 1, schematically indicating a related mode of recording position bits.

A solution to this problem, along the lines taught, is suggested in FIG. 7 where a pair of di-gap heads $h_1$, $h_2$ are mounted in tandem to simultaneously operate on two respective tracks on a disk DD—one track T-1 being one of several carefully centered "prerecorded servo tracks" (or sectors); the other being a new data track (e.g., T-a), whose concentricity is to be assured. Accordingly, it will be evident that head $h_2$ may be "slaved" to head $h_1$ and be servo-centered therewith, so that when head $h_1$ is registered on a "control servo track" (or track segment T-1, using di-gap/di-bit sensing as taught above), head $h_2$ will "follow" and write a related data track which is concentric with T-1 and with disk DD (e.g., T-a "slaved" to T-1, T-b slaved to T-2, etc.). Further, a "bootstrap mode" may be used whereby certain other new data tracks are, in turn, likewise "slaved", during writing, to (the position of) a respective "first-written" data track (e.g., T-n and head $h_2$ slaved to T-1 and head $h_1$).

MIN/MAX MISREGISTRATION

A maximum tolerable misregistration may be built-in to the system by limiting the minimum acceptable amplitude of the servo di-bit read-out. For instance, a 50% misregistration (or 15 "servo-steps" misregistry as above) might be the maximum centering error tolerable; in such case the gaps would be "straddling" two adjacent tracks and the nominal amplitude of the servo read-out pulse corresponding to this might be about 50% of the maximum "fully-centered" read-out amplitude.

In such a case, (and in any instance where a head is so "straddling") the servo control program might be set to arbitrarily command the head to take predetermined corrective action (e.g., "move radially-out ten steps and begin a new centering sequence"). In a related situation, if satisfactory centering were achieved over the wrong track; then upon reading the track number (sensing bits "sb") this would be discovered and no harm done (e.g., no erroneous data read-out would be accepted)—instead, an entirely new "coarse positioning" step could be invoked to re-new the search sequence for the correct selected track. Workers in the art will conceive other conventional ways of handling similar problems using the invention.

Workers will also conceive other ways of employing such servo di-bits. For instance, as described below relative to FIGS. 3 and 3A, one or both oblique portions of a servo di-bit may be interspersed with, or "overwritten" upon, work-bits.

EMBODIMENT OF FIG. 3

Figure 3A:
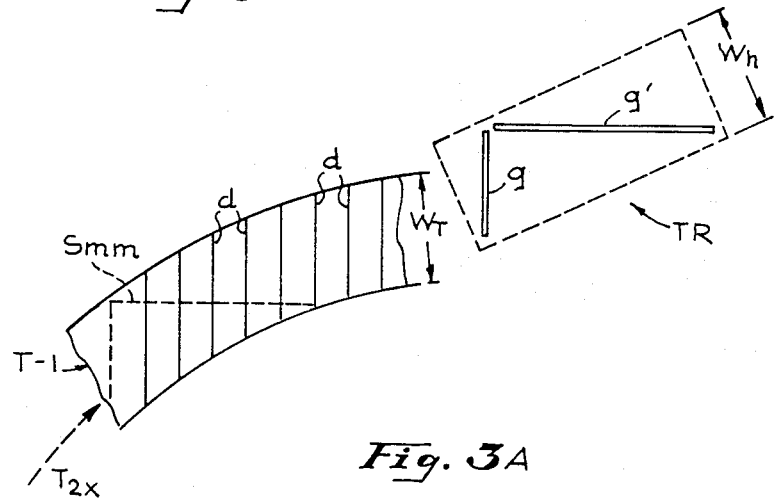

A modified, further improved way of using a skewed orthogonal di-gap transducer, together with similarly-skewed servo-bits is indicated in the embodiment of FIGS. 3 and 3A. Here, a rotatable magnetic disk record D is shown very schematically, with abutting recording tracks (e.g., T-1, T-2, T-3) along which indicated "work-bits" "d" may be recorded as above. Bits "d" will be understood as aligned in parallel oblique to the transport direction (arrow T-A$_X$) and orthogonal between adjacent tracks. A series of "singular" skewed servo-bits "smm" (not di-bits) are here "writtenover", or interspersed among, certain work-bits "d" and orthogonal thereto according to this feature. A di-gap head TR may be used for transducing as before.

Workers will appreciate such a "track-on-data" scheme—with a di-gap head operating on "di-bit tracks" (here, the servo-bits and work-bits cooperate—not pairs of servo-bits) as quite new and advantageous—and one that may be implemented in various ways. The magnetizations represented by these bits and their respective magnetic direction are (as shown), indicated schematically by the parallel lines "d", "smm". The "orthogonality" between bits may be visualized as a 90° rotation of the magnetic axis of the pre-magnetized domains on the virgin substrate.

Except as otherwise described disk D and associated di-gap head TR (with skewed orthogonal gaps g, g' and accessories, like access arm AA, etc.) will be understood as conventional and similar to those described above with respect to FIG. 1. Thus, the orthogonal skewed transducer di-gaps g, g' are disposed and adapted to be aligned in "magnetic congruence", or registration, with either of bits "d" or bits "smm" (head TR having a width $w_h$ approximately equal to the width $w_t$ of the tracks T). Thus, bits "smm" indicated in phantom in FIGS. 3, 3A will be understood as impressed in a prescribed manner over a track sector corresponding to a prescribed plurality of transverse work-bits "d" (—rather than being allocated to separate tracks and/or to separate portions of a data track). Here, servo-bits "smm" span four (4) work-bit sites, for example.

As mentioned above, bits "d", "smm" are skewed, i.e., with respect to "translation axis" T-A$_X$, at angles $\phi$ and $\phi'$ respectively (these preferably being +45° and −45° with respect to TA and thus transverse to one another) and are at right angles with like respective bits from "track-to-track". Such an "adjacent orthogonal/transverse within track" bit array has been described above. Accordingly, as head TR moves radially across disk D, it will be understood as traversing successive disk tracks to stop "semi-registered" over a selected track; then the bits "d", "smm" will be detected by the passing gap that happens to be aligned therewith and "fine-registration" will follow.

Thus, for instance, when head TR is positioned so that gap "g" overlies track T-1 it will be relatively perfectly aligned to record and/or read work-bits "d" with maximum efficiency (being parallel thereto and "magnetically congruent" when superposed)—while companion gap g', aligned transverse to gap "g", will accordingly be oriented for no significant magnetic interaction with bits "d", and for maximal interaction with bits "smm" (gap "g", in turn, being relatively unresponsive to bits "smm").

Likewise, shifting of head TR to overlie track T-2 will reverse the operative sense of gaps g, g' so that gap g' is uniquely operative with data bits "d", (which are orthogonal to the work-bits "d" along track T-1), while gap "g" lies in exclusive operative alignment with servo-bits "smm". Shifting again to register TR along track T-3 will again reverse the operative senses of the gaps (so they are the same as for T-1).

Workers will understand that the recording and reading is performed conventionally, with narrow magnetic gaps g, g' traversing domains in switching-relation so that if a domain ("bit") is aligned relatively parallel to a given gap and translated there-past in "magnetic congruence", a full-scale read-out signal will be induced from the associated transducer reflecting this passage. The polarity of the induced signal will depend, of course, upon the direction of change of magnetic transition.

According to a feature thereof, the distance interval between a pair of adjacent servo-bits along a given track (see interval S between bits "smm" along track T-1 in FIG. 3) will correspond to a prescribed "reference interval", reflecting a prescribed controlled head/disk velocity. When a perfectly registered (or centered) transducer proceeds along the subject track at the prescribed constant speed, servo output pulses "sop" will issue at prescribed times. These times may be represented as $t_0+t$, ($t_0+t_1$, $t_0+t_2$, etc.) reflecting the position of servo bits "smm" with respect to a fixed standard (e.g., Start Radius SR, see FIG. 1; as known in the art—to indicating radius SR). According to a feature hereof, misregistration of the transducer gaps may be detected in terms of time-variations from these "reference times" sensed from associated output servo signals (e.g., $t_0+t_1+t_v$; $t_0+t_2+t_v$, etc.).

Such a misregistration is very schematically indicated in FIG. 3A where transducer gaps g, g' of head assembly TR are misregistered "leftward" of track T-1 (assuming the gaps pass in the direction indicated by the arrow), or displaced "radially outward" of disk D. Track T-1 will be understood to include work-bits "d" aligned to be sensed by gap "g", plus transverse servo-bits "smm" aligned to be sensed by gap g'. Such "leftward misregistration" of head TR will be noted as causing gap g' to intersect (a portion of) servo-bits "smm" somewhat "late" and produce an associated servo output pulse "later" in time (delay $\Delta = +t_v$) than the case where gaps g, g' are centered exactly along track T-1. Conversely, "rightward" misregistration of gaps g, g' would cause the g' output to occur "sooner" (delay $\Delta = -t_v$). Comparison of either such misregistered servo output pulse with a train of "reference pulses" representing the "centered head" (or registration) condition, will yield a time difference value $\pm \Delta t$ which may be used to determine the direction, and degree, of misregistration—as workers can visualize (see FIG. 2 description details).

Workers will recognize that such an "orthogonal" magnetic "overwrite" of servo-bits (upon work-bits will, if the bits are substantially orthogonal), render each bit type uniquely responsive to only one of the di-gaps and magnetically isolated from the other bit type. That is, as workers in the art well known, a bit disposed transverse to a transducer gap is relatively "de-coupled", magnetically therefrom and non-responsive thereto. Also, adjacent orthogonal magnetic domains have relatively little significant magnetic interaction with one another.

For instance, consider bit "smm", in FIG. 3A: the net effect of its magnetic domains will be to produce a relatively strong magnetic output signal (sharp magnetic transition when gap g' passes over "smm" in operative magnetic relation or "magnetic congruence", therewith), while being relatively isolated from (no significant magnetic interaction with) "orthogonal" magnetic domains "d" and essentially, "ignored" by passing orthogonal transducer gap "g" (no output induced therefrom). Conversely, gap "g" will produce no significant servo output signal from the passage of bit "smm"; but only from passage of "d".

Restating this from a somewhat different viewpoint, the instant a servo-bit "smm" passes in perfect registration under gap g', it will (momentarily) essentially "fill" the gap 100% with magnetic flux from its magnetic domains (—here aligned in an East-West direction, and constituting an "E-W flux").

The transverse magnetic domains "d", will (especially if they are widely spaced so that only a few intersect bit "smm") present a transverse ("N-S") flux—a flux that fills only a relatively small portion of elongate gap g' (here the "servo-gap"). And their transverse ("North-South") magnetic alignment will have little or no interaction with the "smm" (E-W aligned) domains. As a consequence, bits "smm" will be relatively "isolated", magnetically, from bits "d" along the track; also bits "smm" can generate a servo output, upon passage of gap g' that is relatively independent of bits "d" and of associated "work gap" "g".

Workers may wonder whether misregistration of the transducer head can seriously degrade read-out from a "selected" track and/or introduce "error signals" from bits along the adjacent track—since the tracks are abutted together. For instance, in the embodiment of FIGS. 3, 3A, misregistration of gap g' to the right (or radially-inward from T-1) would overlap track T-2. This would likely attenuate the "T-1 servo output" (from servo-bits "smm" along track T-1,—to the extent g' is out of "congruence" with gap g') as well as erroneously induce a pick-up in g' from work-bits "d" in adjacent track T-2 (to the extent they register with g').

But, workers are quite familiar with known techniques adaptable to distinguish such servo-bits from such work-bits. For instance, the work-bits may be recorded at a particular high frequency, and/or be spaced closer together than servo-bits. In such a case the work-bit read-out can readily be filtered-out by conventional frequency discrimination techniques—the servo-bits along a given track being referenced to a prescribed known "reference spacing" (timing interval) and thus identified from the raw output pulses. (e.g., the mentioned "reference pulses" from the index hole could be used for this). Also, (as above mentioned) MIN-amplitude discrimination can set a limit on which signals are accepted after such misregistration.

By contrast it will be appreciated that servo di-bits (chevrons) like those indicated in FIGS. 1 and 2 are, for some purposes, more desirable and efficient than single servo-bits—for instance, they are "self-referencing", in the sense of needing no external "reference pulse train" for such purposes. For instance, a control servo pulse train for each track may be stored in "memory" and keyed to the track number and to a prescribed disk rpm. Those may be used as the "reference pulses" to be compared with the raw servo pulses, with any associated errors (lead-time or lag-time) computed with reference thereto.

The significance of the aforementioned dual-gap transducer array and the associated "adjacent orthogonal" alignment of data/servo bits and recording tracks will be evident. Such a "di-bit/di-gap" type "track-on-data" technique is contemplated in the described, and other related recording/servo positioning systems. Such systems will be better understood by consideration of the explanation indicated in FIG. 3B and described below as follows.

FIG. 3B

Figure 3B:
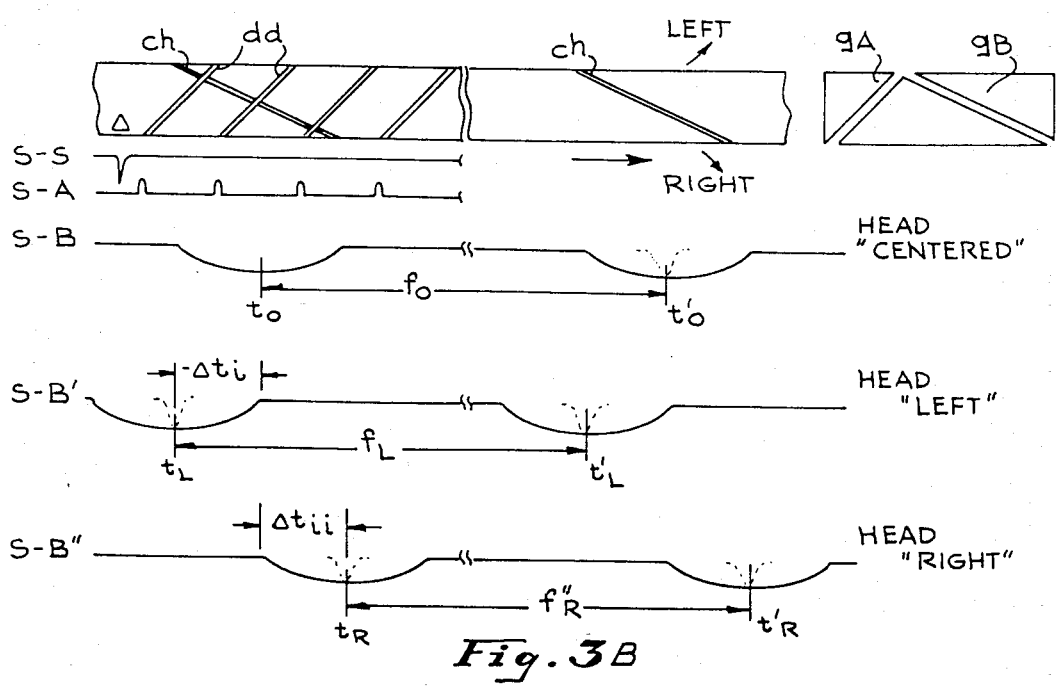

An arrangement like that of FIGS. 3, 3A is very schematically shown in FIG. 3B wherein similar data magnetic bits "dd" are obliquely aligned along the indicated track segment, with transverse singular "servo" bits "ch" similarly arranged at selected regular intervals along the track, but aligned orthogonal to data bits "dd", and laid across several of them. Here, (as above) it will be understood that a di-gap transducer arrangement will present two gaps, each to be uniquely parallel and aligned with bits from only one set (see gap $g_a$ for work-bits "dd", and gap $g_b$ for servo-bits "ch" in FIG. 3B). The "data output pulses" (when bits "dd" are sensed by $g_a$) are represented in idealized fashion by pulse train S-A in prescribed chronological/spatial relation with the depiction of work-bits "dd". A related train of "centered" "servo output pulses" S-B is similarly chronological and spatially referenced to servo-bits "ch", (the output from gap $g_b$). It will be understood that, when exactly "centered", gap $g_b$ detects successive servo-bits "ch" to produce the pulses S-B, peaking at the indicated times ($t_o$, $t_o'$, etc.) separated by prescribed normal clock interval, or frequency $f_o$ (reflecting the corresponding spacing and relative transition speed of the servo-bits relative to gap $g_b$). But if the head is "shifted left", off-center, then a time-shifted pulse train S-B' will be generated; whereas a "shift-right" will generate pulse train S-B''.

In light of the above explanation, workers will recognize that misregistration of the di-gap transducer assembly (particularly gap $g_b$ therein) to the left of the indicated translation direction (see directional arrow on the track FIG. 3B) will produce a train of clock pulses S-B' which will lead the normal "registration-train S-B by a prescribed "error time" ($-\Delta t_i$), the magnitude of which is proportional to the degree of (leftward) misregistration (note negative value of $\Delta t_i$ indicating "leftward error", i.e., a "leading relation to time $t_o$); whereas a rightward misregistration is indicated by pulse train S-B'', namely servo pulses which lag the normal pulse time $t_o$ by prescribed positive error-time ($+\Delta t_{ii}$). As before, one may "center" the transducer simply by comparing the raw servo output [S-B' or S-B''] with a "reference pulse" train [S-B; e.g., stored in memory and issue in prescribed time-relation with the "index pulse"], and using the time-difference ($\pm \Delta t$) to control a conventional servo system (via feedback control, etc.).

MODIFICATIONS IN "DI-GAP" USEAGE; GENERALLY

It will be appreciated that a "di-bit/di-gap; "track-on-data" arrangement and technique as described in the indicated and other related recording-servo positioning systems may be advantageously employed. Such arrangements will be seen as especially advantageous in conjunction with an array of "abutting" of data tracks wherein the work-bits and servo-bits are in orthogonal relation between adjacent tracks and among themselves along a given track.

The above description has been concerned with the manner in which a di-gap head assembly may be precisely positioned among a plurality of selectable abutting track positions using di-bit indicia along the tracks. As pointed out previously, in a conventional type of magnetic disk system to which the present invention may be applied one could employ a plurality of such head assemblies, each arranged to operate with a different sub-set of such tracks—whether provided on a disk or other record medium. It will be understood that the positioning of each such head assembly relative to its data zone may be provided in the same manner as described herein. It will also be understood that, in order to more efficiently employ space on the disk, it is possible to intermingle "work-bits" with orthogonal "position bits" along a track.

However, it will ordinarily be preferred to reserve certain pre-designated "track sectors" for the servo-bits as a means of maintaining the integrity of the servo-indicia inviolate. For instance, a certain amount of "bit-creep" is unavoidable in the course of dozens of cycles of erasing and rewriting work-bits—with the result that, unless an appropriate servo-sector is so reserved, work-bits can shift in position along a track until they eventually creep into the areas of the servo-bits, and become confused therewith. (Unless, of course, the entire track is erased and rewritten, including all servo-bits, with each data update, however minor).

Figure 5:
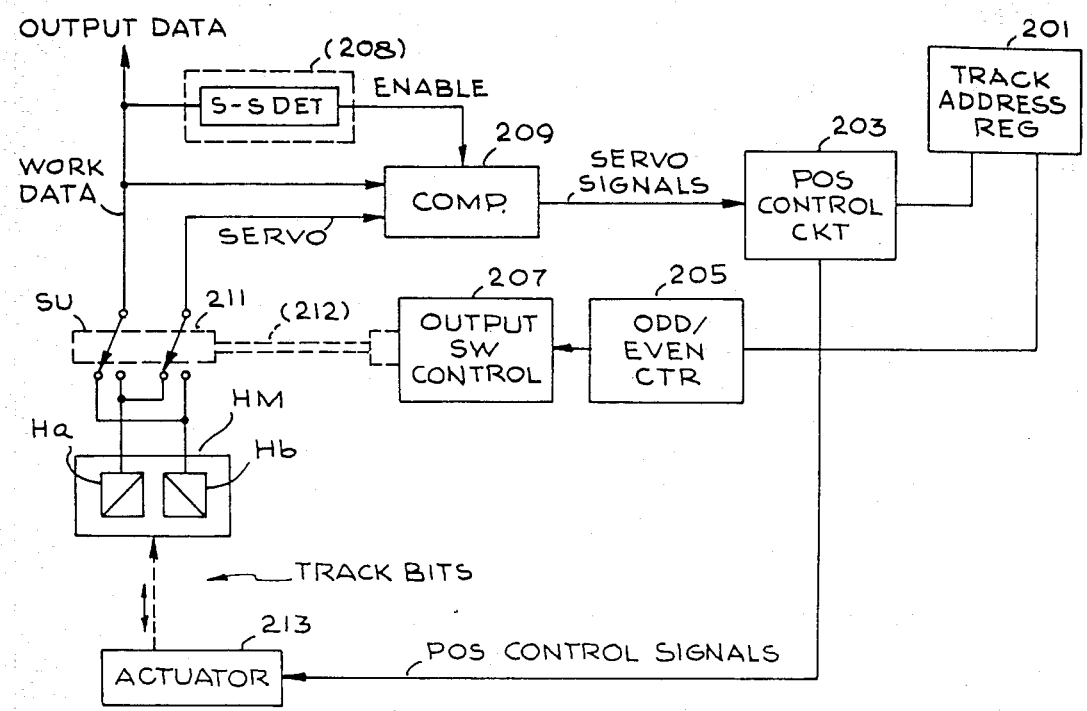
FIG. 5 is a schematic block diagram of a utilization system adapted for "di-bit/di-gap" arrays like the above.

It will also be understood that di-gap heads according to the invention will be applied as generally known in the art. One suitable, preferred type of application is suggested by control system 200 very schematically shown in FIG. 5. System 200 is generally structured and adapted to control the output from such a pair of associated transducers ($H_a$, $H_b$ mounted on a common head mount HM) and implement the associated head repositioning and centering. That is, system 200 includes a switch means 211 adapted to route transducer output (also input) according to which head-gap is detecting work-bits and which is detecting servo-bits. For instance, according to one preferred data format (mentioned above) servo-bits would align with one gap along all even numbered tracks (e.g., as shown here for gap $H_a$—note arrow indicating passage of track bits) and with the other head (e.g., gap $H_b$, here) for all odd-numbered tracks—with work-bits having the reverse format (e.g., here aligned with gap $H_b$ for this even-numbered track).

Accordingly, switch means 211 must be alternated between tracks to implement such a format—e.g., being controlled by an ODD-EVEN counter 205 and associated control 207 responsive to a track address register 201 as shown here. The switch means will include an actuator unit as known in the art (here, only suggested in phantom at 212) and comprise any suitable known mechanism for switching the paired-gap outputs between work-data and servo-data lines.

Such switching of the gap outputs will also involve alternately connecting each gap to a servo feedback loop, implemented as known in the art and, here suggested by comparator (COMP) stage 209 together with position control (circuitry) stage 203, controlling actuator assembly 213 to position (center) the head mount HM over a given track, as is well known in the art.

"COMP" stage 209 preferably is coupled to receive the "work-data" output also, as shown, and includes means for comparing (the synchronism of the) related orthogonal servo bits (e.g., like the two-halves of registration marks "sm" in FIGS. 1, 1A, and generating an output (preferably amplified and digitized), representing the degree of head misregistration according to how synchronous the half-bits are (e.g., as in explanation of FIG. 2). "COMP" stage 209 is also adapted to properly enable, or "gate" this comparison output so it issues only when the desired servo-indicia are detected by the paired gaps. One means of going this is to "gate from the servo pattern itself"—such as by detecting an appropriate "preamble pattern" on the track, or doing so electronically "on the di-bit pattern itself" [e.g., storing di-gap output briefly in a special overflow register and gating-out the contents for servo-use only after detection of this special di-bit indicia]. Workers will contemplate specific known means for effecting this, or for alternative gating. Another gating option is illustrated in phantom at "S-S DET" (a "servo-signal detection") stage 208, which, as known in the art, is adapted to recognize this servo "di-bit" (or related indicia) and, responsively, issue an "enable" signal to so cause stage 209 to issue the mentioned servo signals, applied to "Position Control" stage 203.

Workers will appreciate how aptly such an output processing system cooperates with such "di-bit/di-gap" arrangements for better centering. In particular, the combined "di-bit comparing" and "output-switching" means co-act with the rest of a conventional servo system to effect efficient head-registration without the shortcomings of conventional techniques—e.g., with susceptibility to erroneous amplitude-fluctuation (e.g., due to noise, velocity shift, etc.), or to erroneous or complex velocity variations (e.g., in turntable or in delay or clock mechanisms), etc. Details of this and like implementation are well known to workers (e.g., see similar arrangements in U.S. Pat. No. 4,007,493 to Behr, et al.; U.S. Pat. No. 3,903,545 to Beecroft, et al.; U.S. Pat. No. 3,185,972 to Sippel and U.S. Pat. No. 3,686,649 to Behr, and in other patents cited above).

SPIRAL RECORDING WITH DI-GAPS; FIG. 8

Figure 8:
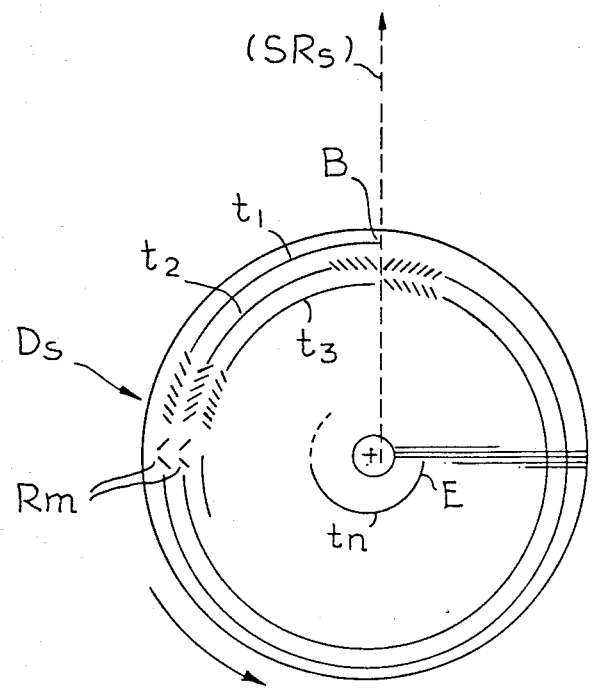

FIG. 8 illustrates one embodiment of the invention as adapted for "spiral recording" [e.g., as opposed to the conventional "concentric track" digital recording on magnetic record disks for computers as above described relative to FIG. 1, etc.]. This embodiment will be understood as carried out on a magnetic record disk $D_s$ with di-gap transducer means. That is, a single, continuous ["open-ended"] spiral track t of magnetic skew bits will be understood as laid down on disk $D_s$ by di-gap read/write head "hs". Track t may be understood as composed of connected one-revolution spiral segments or "laps" [such as tracks: $t_1$, beginning at "start point" B, $t_2$, $t_3$, etc., through $t_n$ terminating at "end-mark" E] wherein adjacent tracks exhibit orthogonally-skewed bits, as illustrated. The tracks can, as aforementioned, be "abutted" to conserve space [see "abutting herringbone" pattern described above].

"ALONG-TRACK" GAP ALIGNMENT

Figure 8A:
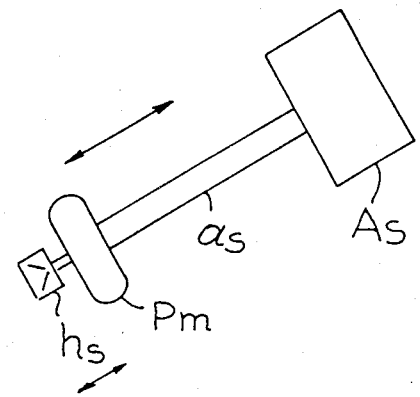
FIG. 8A shows a modified (di-gap) head.
Figure 8A:
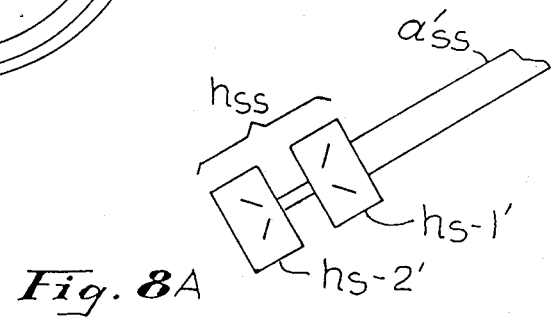

FIG. 8 is also exemplary of an "along-track" mode of gap alignment, as opposed to a "radial" alignment such as indicated in FIG. 8A (described below). Also, and preferably, here, some registration, or centering, di-bits (e.g., "V-shaped" pattern $R_m$ are also placed periodically along each "lap") to accommodate a "fine" servo control of head position whereby head "hs" can better follow the pitch of each track in its continuous spiral path as explained before [here assume a pitch of onetrack-width $W_t$, i.e., a gradual shifting of track radial location each revolution by distance $W_t$].

Thus, one might begin recording on initial track lap $t_1$ at starting point B, along start axis $SR_s$, and record some data bits [skewed, as pictured, with respect to the track axis] with one of the di-gaps of head "hs" as known in the art. Then, when lap $t_1$ is completed, the array would automatically begin recording the next lap $t_2$, switching to the other (transversely aligned) gap of head "hs"—this serving to reverse the direction of bit-skew and provide orthogonally of data bits between adjacent tracks. Similarly, one would switch back to the first gap at the beginning of the next lap, $t_3$; then switch back to begin $t_4$, etc., etc., concluding on the "end point" E at the end of the final, inner-most, lap $t_n$.

The construction and operation of disk $D_s$, of head "hs", and of associated actuator $A_s$, etc., will be understood by workers as conventional [and will correspond to that of the prior discussed embodiment] except as otherwise stated. Thus, transducer actuate means $A_s$ will be understood as adapted to reciprocate head "hs", on arm "as", as radially of disk $D_s$ as known in the art, so as to "follow" the pitch of a spiral track t. Workers will appreciate—as a feature of this combination—such an arrangement is especially apt for thus continually varying gap position (and track position) as a function of disk rotation—spiral recording is simply one example of such a mode. Other examples might be an eccentric circle, an ellipse, etc., as workers in the art will readily understand.

Workers will also appreciate how such an arrangement as this may be readily adapted for "track-on-data" centering of virtually any track pattern, even the conventional "concentric" track pattern [e.g., as used to automatically accommodate "run-out" etc.]. Workers will also perceive that such an arrangement may readily be optimally implemented using state-of-the-art accessory means such as a solid state "servo motor" pm [as described below], together with related control means; or such as a programmable actuator-microcomputer, or the mechanical analog thereof. Workers will also appreciate that such tracks may be laid down in either rotational direction; that is, where disk $D_s$ is rotated clockwise, or rotated counter-clockwise.

"RADIAL" ALIGNMENT OF DI-GAPS

FIG. 8A indicates how the arrangement of FIG. 8 may be modified to include a second [or a third, etc.] such di-gap head; i.e., head hs-2', in addition to hs-1', mounted on actuator arm ass', as understood above. In addition to the characteristics of head "hs" in FIG. 8, this head arrangement will be seen as capable of accommodating simultaneous read/write operations on two or more tracks. For instance, this will be understood as accelerating the data (input/output rate), using parallel rate input/output data channels as known in the art. A "special case" of such a "radial" head alignment and related multi-track read/write mode of operation would be two continuous independent inter-leaved spiral tracks. Workers will also perceive that, in the embodiment of FIG. 8A, one of the di-gap heads, hs-1', happens to be oppositely aligned [along the track direction] from its companion head hs-2', (though it could be similarly aligned instead). Such may be necessary to maintain the adjacent orthoganality between tracks in the "abutting herringbone" pattern preferred.

CENTERING VIA "TRACK-ON-DATA"

Preferably, the embodiment of FIG. 8 involves a centering [fine servo] of technique implemented in the aforedescribed "track-on-data" mode as opposed to other more conventional modes such as a continuous mechanical tracking system with attempts to follow track pitch as a function of disk rotation [e.g., a high precision worm gear on other continuously-operating lead screw thrust array]. Such mechanical arrangements have some undesirable limitations re their precision, their quickness of response, their simplicity, and their expense; also they are particularly difficult to "back-up", i.e., to through into reverse quickly and smoothly.

As discussed below, we prefer to use a suitable stepper motor coupled directly to the transducer arm [see arm "as" FIG. 8] to actuate the di-gap head(s). Such a motor is preferably modified to provide "steps" (translation increments) which are small enough to accommodate the selected track density or pitch [e.g., here, for 100 turns per inch, with a pitch of 0.020 inches we prefer to use a step motor adapted to provide about 18 steps per track width—thus normally moving the gaps about one mil for each approximate 20° of disk revolution].

Of course, workers will appreciate that even with such an arrangement for "normally" advancing the head [radially of the record disk], we will prefer to modify this to control it in a "track-on-data" centering mode as mentioned. This will, of course, help to verify that the head is indeed centered "on-track", as well as better maintain a true centering control [e.g., as opposed to resorting to some indirect expedient that does not monitor actual track position, such as "Table-Lookup", mechanical gearing means or optical tracking of the disk-edge or the disk-rotating spindle, etc.—usually combined with "counting-in" from the disk edge; though these may be acceptable in a "low tpi" array]. Workers will appreciate how aptly the described "spiral recording with di-gaps" is combined with techniques for "centering-on-data".

Workers will also appreciate that recording frequency $f_r$ may be adjusted to better equalize inter-bit separation $S_b$. That is, if one records along the outermost track at a first frequency $f_1$ (for maximizing R/W resolution with a given arrangement of equipment—e.g., 10 K-b/inch), he would reduce $f_r$ as recording proceeded radially-inward of the disk. Alternatively, one could of course, keep $f_r$ constant and surface velocity constant (at the head) as he proceeded inward by increasing spindle rpm, as he proceeded inward though this is more cumbersome.

It will be understood that the preferred embodiments described herein are only exemplary, and that the invention is capable of many modifications and variations in construction, arrangement and use without departing from the spirit of the invention. For example, although it has been assumed that the normal "centered" position along a track would be indicated by indicia on the track—while this is preferable, giving real time/space control data, it is not necessary, since such indicia may be stored in memory and fed to compare means with actual position read-out, as workers can visualize.

Further modifications of the invention are also possible. For example, the means and methods disclosed herein might also be applicable to certain tape systems and the like, or certain drums, etc. Also, the present invention is applicable for providing a certain kind of "spiral recording" using other forms of recording and/or reproducing systems, such as those in which data is recorded and reproduced optically.

The above examples of possible variations of the present invention are merely illustrative. Accordingly, the present invention is to be considered as including all possible modifications and variations coming within the scope of the invention as defined by the appended claims.

What is claimed is:

1. A high density digital data recording medium comprised of at least one "spiral" track, each track comprising respective magnetic "skew bit transitions"; these transitions being oriented in a "first skew direction" along certain non-adjacent track-loops and in a "second skew direction" along all "other" track-loops, this second skew direction being orthogonal to the "first", as "sighted" along the reference spiral track direction, so that, as a result, adjacent spiral tracks present skew bits which are transverse to one another and thus minimize "adjacent bit interference" and therefore also minimize, or eliminate, inter-track "guard bands" common with such high density recording.

2. The record medium as recited in claim 1 wherein adjacent tracks are arrayed in an "abutting herringbone" pattern.

3. The record as recited in claim 1 wherein said transitions also include V-pattern registration marks.

4. The record as recited in claim 1, as produced by at least one di-gap magnetic recording head.

5. The record as recited in claim 1 wherein each track is recorded by a write head means such that bit orientation is rotated 90° from that of the bits in adjacent tracks.

6. A method of recording a long continuous, non-concentric, involuted track of digital data upon a rotating disk surface comprising:
providing at least one di-gap transducer means; and
translating each said transducer means radially of said disk at a prescribed pitch while the disk is rotating, such that the radial position of every track segment is continually changing as a function of its angular rotational position about the disk.

7. The method as recited in claim 6, wherein said record surface is a magnetic recording disk surface; and wherein each transducer means comprises a di-gap magnetic read/write head comprised of at least one pair of mutually orthogonal skewed magnetic recording gaps.

8. The method as recited in claim 7, wherein said translating is arranged and controlled to cause each said transducer means to spiral inward gradually and constantly toward the center of the rotating disk.

9. The spiral disk recording product of the method of claim 8.

10. The method as recited in claim 8, wherein the gaps in each said head are arranged and adapted to record and detect transitions aligned in a respective one of two orthogonal directions skewed with respect to track axis; and wherein the operation of said transducer gaps and said translating are arranged and controlled to create an "abutting herringbone" pattern of spiral recording.

11. The method as recited in claim 10, wherein said gaps are also controlled to record and detect "V-pattern" registration marks.

12. The spiral disk recording product of the method of claim 11.

13. The method as recited in claim 8, wherein the two orthogonal gaps in each said transducer head are arranged and controlled to be aligned along the same recording track.

14. The method as recited in claim 8, wherein the gaps of each said transducer head are arranged and controlled to be aligned and centered along different recording tracks.

15. The spiral disk recording product of the method of claim 6.

16. An improved recording sub-system including an improved recording head arrangement adapted to record and detect first and second associated recording bits aligned in equi-skew, mutually-transverse fashion along prescribed involute track portions of a disk record medium, these bits being similarly, but oppositely skewed relative to the elongate axis of the track and being disposed orthogonal to one another, said subsystem comprising:
at least one di-gap transducer means including at least one pair of skewed, relatively transverse transducer gaps; and
head actuator means adapted to translate said head arrangement radially of said disk while the disk is rotating such that every gap is continuously advanced radially of the rotating disk as a function of disk rotation.

17. The system as recited in claim 16, wherein said head comprises a magnetic head including one or more di-gap magnetic transducer means; and wherein said translate means is arranged and controlled to cause each said head arrangement to define a spiral recording track.

18. The system as recited in claim 17, wherein said translation means is further arranged and controlled to create an "abutting herringbone" spiral track pattern.

19. The system as recited in claim 18, wherein said gaps are arranged and controlled to also record and detect V-configuration magnetic registration patterns.

20. The system as recited in claim 19, wherein each said magnetic recording gap includes output means and wherein is also included output switch means adapted to couple said gap output means to servo utilization means or data utilization means exclusively.

21. The system as recited in claim 19, wherein said actuator arrangement includes an arm and fine positioning means mounted on the arm, being arranged and adapted to increment said associated head radially of said disk in steps defined as a fraction of track pitch in the prescribed spiral track.

22. The system as recited in claim 21, wherein said fine positioning means comprises a piezoelectric motor.

23. The combination recited in claim 22, wherein at least one said head arrangement includes a pair of gaps arranged and controlled to be aligned along different spiral tracks.

24. The system as recited in claim 19, wherein at least one of said head arrangements includes a pair of gaps arranged and controlled to be aligned along a common spiral track segment.

* * * * *

UNITED STATES PATENT AND TRADEMARK OFFICE
CERTIFICATE OF CORRECTION

PATENT NO. : 4,502,082

DATED : February 26, 1985

INVENTOR(S) : Herbert U. Ragle & Norman S. Blessum

It is certified that error appears in the above-identified patent and that said Letters Patent is hereby corrected as shown below:

Col. 3, line 26, change "sprial" to --spiral--.
Col. 4, line 14, change "gap" to --gaps--.
Col. 5, line 11, change "are" to --and--.
Col. 18, line 8, change "going" to --doing--.
Col. 19, line 11, change "orthogonally" to --orthoganality--.

Signed and Sealed this

Twentieth Day of May 1986

[SEAL]

Attest:

Attesting Officer

DONALD J. QUIGG

Commissioner of Patents and Trademarks